(12) United States Patent
Halper et al.

(10) Patent No.: US 7,689,503 B2
(45) Date of Patent: Mar. 30, 2010

(54) PREDATORY LENDING DETECTION SYSTEM AND METHOD THEREFOR

(75) Inventors: Steven C. Halper, St. Charles, MO (US); Constance A. Wilson, Lake St. Louis, MO (US)

(73) Assignee: Interthinx, Inc., Agoura Hills, CA (US)

( * ) Notice: Subject to any disclaimer, the term of this patent is extended or adjusted under 35 U.S.C. 154(b) by 1367 days.

(21) Appl. No.: 09/993,072

(22) Filed: Nov. 13, 2001

(65) Prior Publication Data

US 2003/0093365 A1   May 15, 2003

(51) Int. Cl.
    *G06Q 40/00*   (2006.01)
(52) U.S. Cl. .................. 705/38; 705/35; 705/36 R; 705/37; 705/39; 705/40; 705/41; 705/42; 705/43; 705/44; 705/45; 707/202
(58) Field of Classification Search .............. 705/38, 705/35; 707/202
    See application file for complete search history.

(56) References Cited

U.S. PATENT DOCUMENTS

| | | | | |
|---|---|---|---|---|
| 5,673,402 | A * | 9/1997 | Ryan et al. .................. 705/38 |
| 6,006,242 | A | 12/1999 | Poole et al. ................. 707/531 |
| 6,021,397 | A | 2/2000 | Jones et al. .................. 705/36 |
| 6,029,149 | A | 2/2000 | Dykstra et al. ............... 705/38 |
| 6,088,686 | A | 7/2000 | Walker et al. ................ 705/38 |
| 6,119,103 | A | 9/2000 | Basch et al. ................. 705/35 |
| 6,249,775 | B1 | 6/2001 | Freeman et al. |
| 6,330,546 | B1 | 12/2001 | Gopinathan et al. ......... 705/35 |
| 6,385,594 | B1 | 5/2002 | Lebda et al. |
| 6,597,775 | B2 | 7/2003 | Lawyer et al. |
| 6,820,069 | B1 | 11/2004 | Kogan et al. ................. 706/46 |
| 6,839,682 | B1 | 1/2005 | Blume et al. |
| 6,985,886 | B1 * | 1/2006 | Broadbent et al. ............ 705/38 |
| 6,993,505 | B1 * | 1/2006 | Katz et al. .................... 705/38 |
| 7,406,442 | B1 * | 7/2008 | Kottmeier et al. ............. 705/35 |
| 7,412,417 | B1 | 8/2008 | Tuttle |
| 2001/0042785 | A1 | 11/2001 | Walker et al. ............... 235/379 |
| 2001/0047326 | A1 * | 11/2001 | Broadbent et al. ............ 705/38 |
| 2002/0052835 | A1 * | 5/2002 | Toscano ...................... 705/38 |
| 2003/0050879 | A1 | 3/2003 | Rosen et al. |
| 2003/0093366 | A1 | 5/2003 | Halper et al. |
| 2003/0229581 | A1 | 12/2003 | Green et al. .................. 705/38 |
| 2004/0117302 | A1 | 6/2004 | Weichert et al. ............. 705/40 |

OTHER PUBLICATIONS

"Electronic Loan Review" by Affinity Corporation, web page located at http://www.teamaffinity.com/content/lenders/elr.asp.

"FraudGuard.com" by Affinity Corporatin, web page located at http://www.fraudguard.com/default/asp.

(Continued)

Primary Examiner—Kirsten S Apple
(74) Attorney, Agent, or Firm—McCarter & English, LLP (57) ABSTRACT

A predatory lending detection system and method are described. The system is adapted to receive information pertaining to loans, store general loan information, as well as predatory lending laws, and process the loan information to detect violations of applicable predatory lending laws. In particular, the system compares the loan information to the general loan information and to the applicable predatory lending laws, detects variances therebetween, and scores such detected variances to determine a risk category for the loan.

11 Claims, 9 Drawing Sheets

OTHER PUBLICATIONS

"Safecheck" by Affinity Corporation, web page located at http://www.teamaffinity.com/content/lenders/safecheck.asp.

"Bankruptcy Search" by Affinity Corporation, web page located at http://www.teamaffinity.com/content/lenders/bankruptcy_search.asp.

"Address Validation" by Affinity Corporation, web page located at http://www.teamaffinity.com/content/lenders/address_validation.asp.

"National Phone Directory" by Affinity Corporation, web page located at http://www.teamaffinity.com/content/lenders/national_phone_dir.asp.

"Pre-Funding Comprehensive Screening Audit" by Affinity Corporation, web page located at http://www.teamaffinity.com/content/lenders/screening.asp.

"Directed Audit Services" by Affinity Corporation, web page located at http://www.teamaffinity.com/content/lenders/audit_services.asp.

"Asset Search" by Affinity Corporation, web page located at http://www.teamaffinity.com/content/lenders/asset_search.asp.

"Fraud Guard" brochure by Affinity Corporation (4 pages).

Nissenbaum, Dion, "State sells birth data to Web site, raising ID theft fears", Mercury News Sacramento Bureau webpage printout from http://www.siliconvalley.com/docs/news/depth/037140.htm (Nov. 28, 2001), (3 pages).

Email communication from AROBERTSON@TEAMAFFINITY.COM, dated Dec. 3, 2001, Subject: Setting the Standard for Excellence (3 pages).

Office Action dated Feb. 25, 2008, from pending U.S. Appl. No. 10/046,945 (10 pages).

Office Action dated Jul. 27, 2007, from pending U.S. Appl. No. 10/046,945 (9 pages).

Office Action dated Jan. 29, 2007, from pending U.S. Appl. No. 10/046,945 (6 pages).

Office Action dated Dec. 4, 2008, from pending U.S. Appl. No. 10/046,945 (15 pages).

Office Action dated Jul. 22, 2009, from pending U.S. Appl. No. 10/046,945 (10 pages).

Emory University School of Law, "Predatory Mortgage Lending Abuses," http://www.law.emory.edu/PI/ALAS/EXHIB.HTM, last visited on Sep. 27, 2001, pp. 1-6.

American Association of Retired Perspons, "Avoid Predatory Lenders," http://www.aarp.org/confacts/money.prelend.html, last visited on Sep. 27, 2001, pp. 1-4.

Federal Trade Commission, "FTC Consumer Alert! Avoiding Home Equity Scams," http://www.ftc.gov/bcp/conline/pubs/alerts/eqtyalrt.htm, last visited on Sep. 27, 2001, pp. 1-2.

National Consumer Law Center, "Preventing Foreclosures: Spotting Loan Scams Involving Vulnerable Homeowners," http://www.consumerlaw.org/consumer/foreclose.html, last visited on Sep. 27, 2001, pp. 1-5.

Citibank, "Tell Citibank What is Predatory Lending?," http://www.tellcitibank.org/predatorylending.htm, last visited on Sep. 27, 2001, pp. 1-2.

Center for Community Change, "Anti-Predatory Lending Bill Set To Be Introduced in Senate; Additional Co-Sponsors Are Being Sought," http://www.communitychange.org/NRP/52101alert.asp, last visited on Sep. 28, 2001, pp. 1-2.

Mortgage Bankers Association, "Tackling Predatory Lending: Regulation and Education," Cleveland State University, Cleveland, Ohio, Mar. 23, 2001; http://www.mbaa.org/resources/predlend/2001/0323.html, last visited on Oct. 12, 2001, pp. 1-4.

California Reinvestment Committee, "Press Releases," http://www.calreinvest.org/PredatoryLending/HOEPAFactSheet.html, Feb. 7, 2001, last visited on Oct. 12, 2001, pp. 1-4.

HSH, "Understanding Private Mortgage Insurance," http://www.hsh,com/pamphlets/mgicpmi.html, last visited on Oct. 24, 2001, pp. 1-2.

HSH, "How Mortgage Insurance Works," http://www.hsh.com/pamphlets/mgicmi101.html, last visited on Oct. 24, 2001, pp. 1-2.

Loanpage, "Private Mortgage Insurance," http://www.loanpage.com/morpmi.htm, last visited on Oct. 24, 2001, pp. 1-2.

"Automated Property Valuation Sample Report," http://www.factualdata.com/prod_serv/EZvalue.htm, Nov. 30, 2001, pp. 1-3.

DataQuick, "News & Updates: DataQuick to Offer All-New Freddie Mac Automated Valuation Model," http://www.dataquick.com/articleitem.asp?industry=3&item=20, last visited on Nov. 30, 2001, pp. 1-2.

Case Shiller Weiss, "Press Releases," http://www.cswv.com/news/press, last visited on Nov. 30, 2001, pp. 1-2.

Case Shiller Weiss, "Products," http://www.cswv.com/products/, last visited on Nov. 30, 2001, pp. 1-2.

Case Shiller Weiss, "Case," http://www.cswv.com/products/casa/, last visited on Nov. 30, 2001, pp. 1-2.

Case Shiller Weiss, "Sample CASA Report," http://www.cswv.com/products/casa/sample.html, last visited on Nov. 30, 2001, pp. 1-2.

Case Shiller Weiss, "CASA Report Elements and Features," http://www.cswv.com/products/casa/personal.html, last visited on Nov. 30, 2001, pp. 1-3.

* cited by examiner

| A. | | B. TYPE OF LOAN | | OMB No 2502 0265 |
|---|---|---|---|---|
| | | 1 ☐ FHA  2 ☐ FmHA  3 ☒ CONV UNINS | | |
| U.S. DEPARTMENT OF HOUSING AND URBAN DEVELOPMENT | | 4 ☐ VA  5 ☐ CONV INS | | |
| | | 6 FILE NUMBER | | 7 LOAN NUMBER |
| SETTLEMENT STATEMENT | | REF NUMBER | | LOAN NUMBER |
| | | 8 MORTGAGE INSURANCE CASE NUMBER | | |

C. NOTE — This form is furnished to give you a statement of actual settlement costs. Amounts paid to and by the settlement agent are shown. Items marked "(p.o.c)" were paid outside the closing, they are shown here for informational purposes and are not included in the totals.

| D. Name and Address of Borrower | E. Name and Address of Seller |
|---|---|
| BORROWER1 SAMPLE, BORROWER2 SAMPLE  MAILING STREET, MAILING CITY,  CALIFORNIA 90746 | |
| F. Name and Address of Lender | G. PROPERTY LOCATION |
| Document Systems, Inc. (DEMO)  20501 South Avalon Blvd. Suite B  CARSON, CALIFORNIA, 90746 | 1234 PROPERTY STREET  PROPERTY CITY, CALIFORNIA 90746 |

| H. SETTLEMENT AGENT | PLACE OF SETTLEMENT | I. SETTLEMENT DATE |
|---|---|---|
| ABC CLOSING COMPANY | 123 CLOSING STREET  CLOSING CITY, CALIFORNIA 90746 | 07/12/99 |

L. SETTLEMENT CHARGES

| | PAID FROM BORROWER'S FUNDS AT SETTLEMENT | PAID FROM SELLER'S FUNDS AT SETTLEMENT |
|---|---|---|
| 700. TOTAL SALES BROKER'S COMMISSION  BASED ON PRICE $ @ % = | | |
| Division of Commission (line 700) as follows | | |
| 701. $ to | | |
| 702. $ to | | |
| 703. Commission paid at Settlement | | |
| 704. | | |
| 800. ITEMS PAYABLE IN CONNECTION WITH LOAN | | |
| 801. Loan Organization Fee 1.000% to: Lender | 200.00 | |
| 802. Loan Discount | | |
| 803. Appraisal Fee | | |
| 804. Credit Report to: Lender | 50.00 | |
| 805. Lender's Inspection Fee | | |
| 806. Mortgage Insurance Application Fee | | |
| 807. Assumption Fee | | |
| 808. Loan Organization Fee | | |
| 809. Document Preparation Fee to: Lender | 100.00 | |
| 810. Yield Adjustment Credit | | |
| 811. Servicing Release Premium | | |
| 812. ADMINISTRATION FEE to: Broker | 200.00 | |
| 813. COURIER FEE to: Broker | 250.00 | |
| 814. CREDIT REPORT to: Broker | 350.00 | |
| 815. WAREHOUSE FEE to: Lender | 400.00 | |
| 816. | | |
| 817. | | |
| 900. ITEMS REQUIRED BY LENDER TO BE PAID IN ADVANCE | | |
| 901. Interest from 07/16/99 to 08/01/99 @ $ 6.3014 /day | 100.82 | |
| 902. Mortgage Insurance Premium for months to | | |
| 903. Hazard Insurance Premium for years to | | |
| 904. Flood Insurance Premium years to | | |
| 905. | | |
| 1200. GOVERNMENT RECORDING AND TRANSFER CHANGES | | |
| 1201. Recording fees: Deed $ ;Mortgage $ ,Releases | 300.00 | |
| 1202. City/county tax/stamps: Deed $ ;Mortgage $ | | |
| 1203. State tax/stamps: Deed $ ;Mortgage $ | | |
| 1204. | | |
| 1205. | | |
| 1300. ADDITIONAL SETTLEMENT CHARGES | | |
| 1301. Survey | | |
| 1302. Pest Inspection | | |
| 1303. | | |
| 1304. | | |
| 1305. | | |
| 1400. TOTAL SETTLEMENT CHARGES (enter on lines 103, Section J and 502, Section K) | | |

FIG. 5

FEDERAL TRUTH-IN-LENDING DISCLOSURE STATEMENT
(THIS IS NEITHER A CONTRACT NOR A COMMITMENT TO LEND)

Loan Number: LOAN NUMBER  
Creditor: Document Systems, Inc. (DEMO)  
Address: 20501 South Avalon Blvd. Suite B, CARSON, CALIFORNIA 90746  
Date: JULY 9, 1999

Borrower(s): BORROWER1 SAMPLE, BORROWER2 SAMPLE  
Address: MAILING STREET, MAILING CITY, CALIFORNIA 90746  
Lines containing an "x" are applicable:

52

| ANNUAL PERCENTAGE RATE | FINANCE CHARGE | Amount Financed | Total of Payments | ☐ Total Sale Price |
|---|---|---|---|---|
| The cost of your credit as a yearly rate. | The dollar amount the credit will cost you. | The amount of credit provided to you or on your behalf. | The amount you will have paid after you have made all payments as scheduled. | The total cost of your purchase on credit including your down-payment of $ |
| 11.007 % | $ 44,848.98 | $ 18,699.18 | $ 63,548.16 | $ |

PAYMENTS: Your payment schedule will be:

| Number of Payments | Amount of Payment** | When Payments Are Due | Number of Payments | Amount of Payment** | When Payments Are Due | Number of Payments | Amount of Payment** | When Payments Are Due |
|---|---|---|---|---|---|---|---|---|
| | | Monthly Beginning | | | Monthly Beginning | | | Monthly Beginning |
| 12 | 198.06 | 09/01/99 | | | | | | |
| 348 | 175.78 | 09/01/00 | | | | | | |

___ DEMAND FEATURE: This obligation has a demand feature.  
_X_ VARIABLE RATE FEATURE: Your loan contains a variable rate feature. Disclosure about the variable rate feature have been provided to you earlier.

INSURANCE: The following insurance is required to obtain credit:  
    ___ Credit life insurance and credit disability    _X_ Property Insurance    ___ Flood Insurance    ___ Private Mortgage Insurance  
    You may obtain property insurance from any insurer that is acceptable to the Lender.  
SECURITY: You are giving a security interest in: 1234 PROPERTY STREET, PROPERTY CITY, CALIFORNIA 90746  
    ___ The goods or property being purchased    _X_ Real property you already own.  
FILING FEES: $ 300.00  
LATE CHARGE: If payment is more than __15__ days late, you will be charged __5.000__ % of the payment.*  
PREPAYMENT: If you pay off early, you      * or $5.00 (whichever is greater)  
    ___ may   _X_ will not    have to pay a penalty.  
    ___ may   _X_ will not    be entitled to a refund of part of the finance charge.  
ASSUMPTION: Someone buying your property  
    ___ may    ___ may, subject to conditions   _X_ may not    assume the remainder of your loan on the original terms.  
See your contract documents for any additional information about nonpayment, default, any required repayment in full before the scheduled date and prepayment refunds and penalties.  
_X_ "e" means an estimate    ___ all dates and numerical disclosures except the late payment disclosures are estimates.

Each of the undersigned acknowledge receipt of a complete copy of this disclosure. The disclosure does not constitute a contract or a commitment to lend.

______________________________ ____________    ______________________________ ____________  
(Applicant) BORROWER1 SAMPLE    (Date)      (Applicant) BORROWER2 SAMPLE    (Date)

______________________________ ____________    ______________________________ ____________  
(Applicant)    (Date)      (Applicant)    (Date)

______________________________ ____________    ______________________________ ____________  
(Applicant)    (Date)      (Applicant)    (Date)

** NOTE: Payments shown above do not include reserve deposits for taxes, assessments, and property or flood insurance.

FIG. 6

Loan Number LOAN NUMBER

ADJUSTABLE RATE NOTE
(1 Year Treasury Index–Rate Caps)

THIS NOTE CONTAINS PROVISIONS ALLOWING FOR CHANGES IN MY INTEREST RATE AND MY MONTHLY PAYMENT. THIS NOTE LIMITS THE AMOUNT MY INTEREST RATE CAN CHANGE AT ANY ONE TIME AND THE MAXIMUM RATE I MUST PAY.

JULY 9, 1999                                                            CARSON, CALIFORNIA
[Date]                                                               [City]                    [State]

1234 PROPERTY STREET, PROPERTY CITY, CALIFORNIA 90746
[Property Address]

/ 50

1. BORROWER'S PROMISE TO PAY

In return for a loan that I have received, I promise to pay U.S. $20, 000.00      (this amount is called "Principal"), plus interest, to the order of the Lender. The Lender is Document Systems, INC. (DEMO), A California Corporation
I will make all payments under this Note in the form of cash, check or money order.

I understand that the Lender may transfer this Note. The Lender or anyone who takes this Note by transfer and who is entitled to receive payments under this Note is called the "Note Holder."

2. INTEREST

Interest will be charged on unpaid principal until the full amount of Principal has been paid. I will pay interest at a yearly rate of 11.500 %. The interest rate I will pay will change in accordance with Section 4 of this Note.

The interest rate required by this Section 2 and Section 4 of this Note is the rate I will pay both before and after any default described in Section 7(B) of this Note.

3. PAYMENTS (A) Time and Place of Payments

I will pay principal and interest by making a payment every month.

I will make my monthly payment on the 1st day of each month beginning on SEPTEMBER 1, 1999. I will make these payments every month until I have paid all of the principal and interest and any other charges described below that I may owe under this Note. Each monthly payment will be applied as of its scheduled due date and will be applied to interest before Principal. If, on AUGUST 1 2029, I still owe amounts under this Note, I will pay those amounts in full on that date, which is called the "Maturity Date."

I will make my monthly payments at 20501 South Avalon Blvd, Suite B, CARSON, CALIFORNIA 90746
                                             or at a different place if required by the Note Holder.

(B) Amount of My Initial Monthly Payments

Each of my initial monthly payments will be in the amount of U.S. $198.06     . This amount may change.

(C) Monthly Payment Changes

Changes in my monthly payment will reflect changes in the unpaid principal of my loan and in the interest rate that I must pay. The Note Holder will determine my new interest rate and the changed amount of my monthly payment in accordance with Section 4 of this Note.

---

MULTISTATE ADJUSTABLE RATE NOTE-ARM 5-2-Single Family-Fannie Mae/Freddie Mac MODIFIED INSTRUMENT
FANNIE MAE ARM 4-2/5-2/6-2                                                                Form 3502 1/01

Page 1 of 4

FIG. 7

DISSCLOSE (3.0) — 400

| DISSCLOSE CONFIRMATION PAGE |
|---|

401 — DATE: 05/04/2000 6:10:32 PM  PRINT THIS PAGE
DISSCO ID: DISSCO20002013123  LOAN NUMBER: 123456789 — 418
BORROWER: JOHN MOUSE  ☐ Number of times loan was successfully scored: 3 — 416

410

| DISSCLOSE STATUS: | INVESTIGATE | | | DISSCLOSE SCORE: 320 | |
|---|---|---|---|---|---|
| | Transgression | Description | * | Action to Resolve | * |
| 1. | APR exceeds limit allowed by state/local regulations | Dekalb Co., GA: APR not to exceed T-bill + 5% | ☐ | | ☐ ✓ |
| 2. | Loan meets state/local guidelines for HCL and state/local regulations do not allow for financing of Credit Life Ins. On HCL's. | Dekalb Co., GA: no financing of credit life, credit disability, credit unemployment or any other life or health insurance. | ☐ | | ☐ ✓ |

404

LEGEND:

* - RESOLVED: Checked indicates satisfaction of condition and supporting documentation to be attached.
☐ - COMMENT FIELD
   ✓ - Comment Available (Click to EDIT/VIEW a Comment).
   ✓ - No Comments (Click to ADD a Comment).

| Description From DISSCO |
|---|

LOAN NUMBER: 123456789

402

| LOAN AMOUNT: | $102,403.00 | ESTIMATED/APPRAISED VALUE: | $102,500.00 |
|---|---|---|---|
| PURCHASE PRICE: | $102,403.00 | SUBORDINATE FINANCING: | |
| PURPOSE: | PURCHASE | PROPERTY TYPE: | SINGLE FAMILY |
| OCCUPANCY: | OWNER OCCUPIED | APPLICATION DATE: | 05/03/2000 |
| LTV: | 100.00% | CLTV: | 0.00% |

| Federal Truth in Lending | | | | | |
|---|---|---|---|---|---|
| | | | | | |
| 13.025% | | | | | |
| | | | | | |
| YES | YES | NO | NO | NO | NO |

FIG. 8

BORROWER 2 INFORMATION

DISSCO ID: DISSCO20002013123    LOAN NUMBER: 123456789

GENERAL INFORMATION

72 →
- Last Name: WALTER *
- First Name: CONNIE *
- Phone Number: 301-777-5553
- U.S. Citizen: ☑ *
- Middle Name: MICHELLE
- Social Security #: 222-22-2222 *
- Age: 38

CURRENT RESIDENCE

74 →
- ☐ Same As a Subject Property
- ☐ Same As Borrower
- St. Number: 1212
- St. Name: MAIN
- Post Direction: Direction ▼
- City: AURORA
- St. Direction: North ▼
- St. Type: STREET ▼
- Unit #:
- State: Colorado ▼  Zip: 80055

EMPLOYER 1 INFORMATION

76 {
- Employer Name: AURORA INC.
- Phone Number: 301-111-1111
- Monthly Base Income: 1500
- Self Employed: ☐
- Position: MANAGER
- Monthly Total Income: 1500
- Years on Job: 6

EMPLOYER 1 ADDRESS

- St. Number: 1111
- St. Name: NEW
- Post Direction: Direction ▼
- City: AURORA
- St. Direction: South ▼
- St. Type: AVENUE ▼
- Unit #:
- State: Colorado ▼  Zip: 80013

EMPLOYER 2 INFORMATION

- Employer Name:
- Phone Number:
- Self Employed: ☐
- Position:
- Years on Job:

EMPLOYER 2 ADDRESS

78 {
- St. Number:
- St. Name:
- Post Direction: Direction ▼
- City:
- St. Direction: Direction ▼
- St. Type: Street Type ▼
- Unit #:
- State: State ▼  Zip:

80 — [Save Data]   [Cancel] — 82

PREDATORY LENDING DETECTION SYSTEM AND METHOD THEREFOR

FIELD OF THE INVENTION

This invention relates to a system and method for closing a loan and in particular, a predatory lending detection system and method therefor.

BACKGROUND OF THE INVENTION

With the deregulation of the consumer credit industry and inflation of property values, a market for equity-secured lending has emerged. For example, most home improvement loans are tied to the equity on the home. Regrettably, a practice known as predatory lending has also emerged. Predatory lending involves financial institutions which use high fees, outrageous costs and other unscrupulous or deceptive lending practices to strip the equity from a homeowner's home. Such practices are usually targeted to the poor, elderly and minorities, who typically lack access to traditional banking services and rely on financial companies or other less regulated lenders.

The Federal Trade Commission has identified several practices for which homeowners should be "on the lookout" and has posted them on its website located at www.ftc.gov. Such predatory practices include (1) equity stripping (e.g., the lender gives a homeowner a loan based on the equity in his or her home and not on the homeowner's ability to repay); (2) loan flipping (e.g., the lender encourages the homeowner to repeatedly refinance the loan and often to borrow more money); (3) credit insurance packing (e.g., the lender adds credit insurance to the homeowner's loan, regardless of need); (4) steering (e.g., the lender puts borrowers with good credit into loans with high interest rates and away from more affordable options); (5) pre-payment penalty charges (e.g., the lender tries to lock borrowers into predatory loans for as long as possible, making it extremely difficult or impossible for borrowers to refinance or otherwise get out from under the loan); (6) "hidden balloon" payments (e. g., the lender sets up the loan so at the end of the loan, the borrower still owes most of the principal amount borrowed, and offers to refinance the mortgage at excessive fees to eliminate the balloon payment); (7) "bait and switch" (e.g., the lender offers one set of loan terms when the borrower applies, then pressures him or her to accept higher charges when he or she signs to complete the loan.); (8) packing (e.g., packing the loan with exorbitant fees); and (9) fraud (e.g., the manipulation of data to qualify unqualified borrowers).

In addition, federal credit laws and consumer protection statutes have been enacted to deter such practices. For example, the Home Ownership and Equity Protection Act of 1994 ("HOEPA") includes restrictions on financing of points and fees, limitations on the payment of prepayment penalties, and prohibition on balloon payments. Several states, cities and counties have also passed similar predatory lending laws to combat this problem. In fact, given the increased occurrence of predatory lending, legislation is being introduced to expand the number of loans subject to HOEPA.

The above measures are helping to try to reduce the occurrence of predatory lending. However, at least with respect to the poor, elderly, and minorities, the ability to get access to such information let alone any sort of legal assistance is very difficult. Moreover, these measures do not prevent predatory lending from happening in the first place. In addition, the variations between the current predatory lending laws at the federal, state, city and county levels, makes it is very difficult for lenders to keep track of these laws and ensure compliance with them. This problem is becoming increasingly worse as more states, cities and counties adopt their own version of such laws.

While the effects of predatory lending are most directly felt by the individual applying for a loan, lenders are also significantly affected by it, especially wholesale mortgage companies who purchase loan pools or individual loans that have originated elsewhere, such as by mortgage brokers and mortgage bankers. In the secondary market, purchasers and assignees can be held liable for all claims on loans in their possession. Penalties for predatory lending violations include substantial monetary penalties such as repayment of twice the amount of all interest, fees, discounts and charges as well as court and attorney fees to the borrower. In addition, violations of predatory lending laws can result in the temporary or permanent suspension of business privileges of the lender, such as the ability to sell to quasi-governmental agencies (e.g., Freddie Mac and Fannie Mae) in secondary markets or the ability to sell certain types of loans. In some cases, lenders can lose their licenses and face imprisonment. Moreover, given the ever changing state of the law in this area, the time and costs required by a lender to stay abreast of new developments, as well as understand all of the variations of the state, city and county laws that currently exist is becoming prohibitive, especially for smaller lenders.

There is, therefore, a need for a system and method for automatically detecting any instances of predatory lending during the closing of a loan regardless of its geographic origin.

BRIEF SUMMARY OF THE INVENTION

It is in view of the above problems that the present invention was developed. The invention is directed to a predatory lending detection system having a mechanism for receiving loan information pertaining to one or more loans, a mechanism for storing general loan information, and a mechanism for processing the loan information for each loan to detect predatory lending without requiring knowledge of predatory lending laws on the part of a user of the system. The processing mechanism includes a mechanism for comparing the loan information for each loan to one or more of the predatory lending laws applicable to the loan and to the general loan information to detect one or more variances therebetween, each variance having a certain degree, and a mechanism for scoring each variance based upon the degree thereof to determine a risk category for each loan based on the sum of the scores for each detected variance associated therewith. The system may further include a mechanism for notifying a user of the system when one or more variances are detected, as well as for tracking the status of each detected variance associated with each loan. The processing mechanism may determine one or more steps needed to resolve each detected variance, of which the user is notified via the notification mechanism. The predatory lending laws may include at least one of a city, county and state law, the loan information includes a city, county and state in which each loan is to be closed, such that the processing mechanism identifies the city, county and state associated with each loan, and applies the predatory lending laws of the identified city, county and state to the loan information for each loan. The processing mechanism may further include a mechanism for detecting fraud in connection with the loan based on the detected variances. The system may be web-enabled.

The invention is also directed to a predatory lending detection system having a receiving mechanism being adapted to receive information pertaining to one or more loan, a storage device being adapted to store general loan information, and a processor being adapted to process the loan information to calculate a score for each variance between the loan information and at least one of a plurality of predatory lending laws and the general loan information. The processor is adapted to process all of the scores calculated in association with each loan to determine a risk category for each loan based on the sum of the scores. The system may further include a detector being adapted to detect fraud in connection with the loan based on all variances associated therewith. The processor may be further adapted to track the status of each detected variance associated with each loan. The system may be web-enabled.

The invention is also directed to a computer-readable medium whose contents cause a computer system to detect predatory lending in connection with one or more loans by performing the steps of receiving information pertaining to the one or more loans, storing general loan information, comparing the information for each loan to a plurality of predatory lending laws and to the general loan information to detect one or more variances therebetween, each variance having a certain degree, and scoring each variance based upon the degree thereof, whereby knowledge of the predatory lending laws on behalf of a user of the system is not required. The medium may further include the steps of determining a risk category for each loan based on the sum of the scores for each detected variance associated therewith, notifying a user of the system when one or more variances are detected, determining one or more steps needed to resolve each detected variance and notifying the user of each detected variance and the one or more steps necessary to resolve it, tracking the status of each detected variance associated with each loan, and detecting fraud in connection with the loan based on the one or more detected variances.

The invention is further directed to a computer-implemented method of detecting predatory lending in connection with one or more loans, including the steps of receiving information pertaining to the one or more loans, storing general loan information, comparing the information for each loan to a plurality of predatory lending laws and to the general loan information to detect one or more variances therebetween, each variance having a certain degree, and scoring each variance based upon the degree thereof, whereby knowledge of the predatory lending laws on behalf of a user of the system is not required. The method may further include the steps of determining a risk category for each loan based on the sum of the scores for each detected variance associated therewith, notifying a user of the system when one or more variances are detected, determining one or more steps needed to resolve each detected variance and notifying the user of each detected variance and the one or more steps necessary to resolve it, tracking the status of each detected variance associated with each loan, and detecting fraud in connection with the loan based on the one or more detected variances. The method may be implemented in a web-based environment.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention. In the drawings:

FIG. 5 shows a sample of selected portions of a U.S. Department of Housing and Urban Development Settlement Statement.

FIG. 6 shows a sample of a Federal Truth-In-Lending Disclosure Statement.

FIG. 7 shows a sample of selected portions of an Adjustable Rate Note.

DETAILED DESCRIPTION OF THE INVENTION

Figure 1:
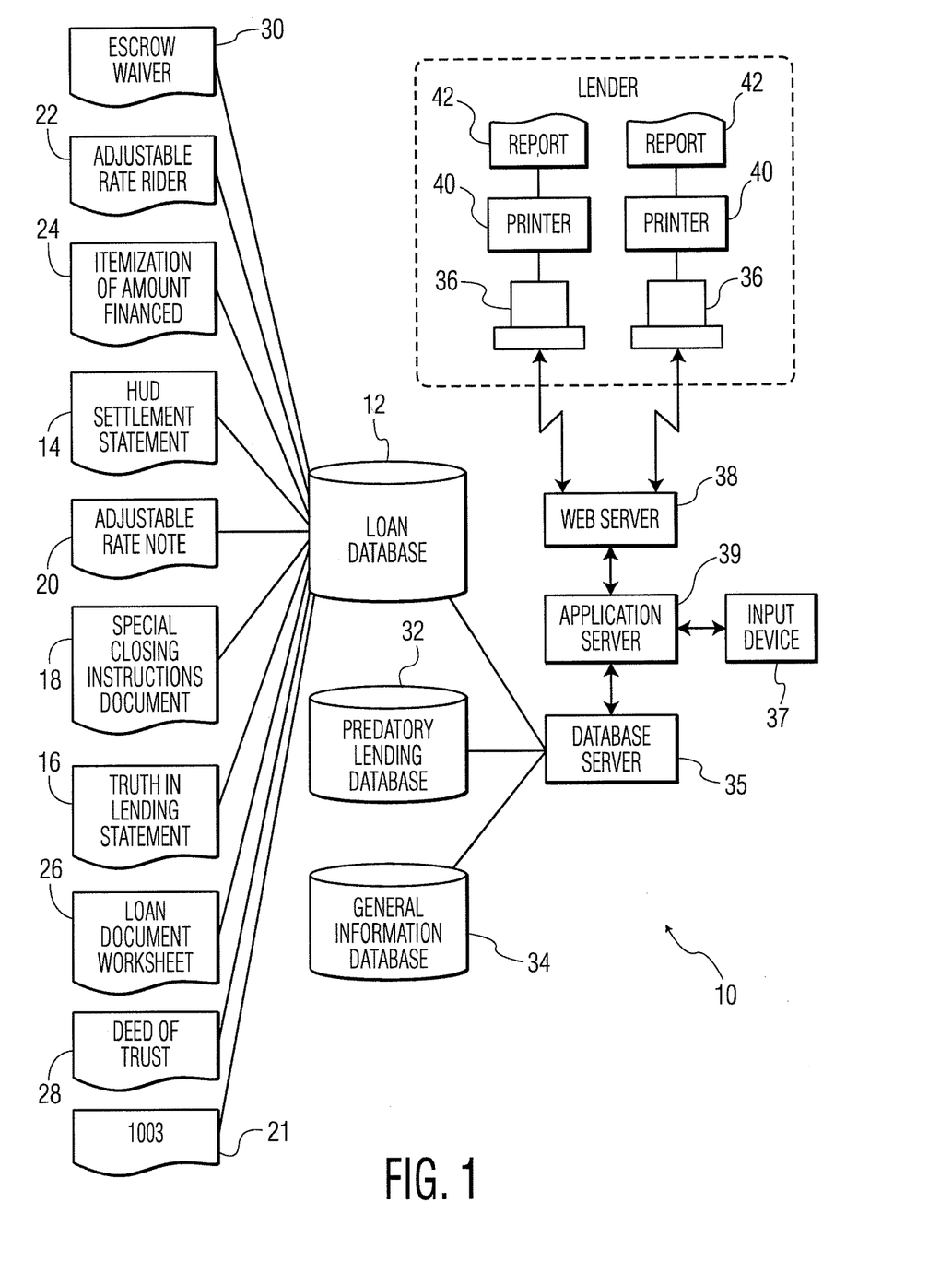
FIG. 1 is a block diagram of a predatory lending detection system in accordance with one embodiment of the present invention.

FIG. 1 shows a block diagram of a predatory lending detection system 10 in accordance with one embodiment of the present invention. While the system 10 will be described in connection with a mortgage, it can be appreciated that the system 10 can be applied to any type of loan which may be subject to predatory lending laws. The system 10 consists of a plurality of databases for storing a plurality of different types of information. In particular, a loan database 12 stores a variety of information about loans being processed by system 10. Such loan information comes from a variety of loan documents, which may include without limitation, a U.S. Department of Housing and Urban Development (HUD) Settlement statement 14, a Federal Truth-In-Lending Disclosure statement 16, a Specific Closing Instructions document 18, a Note 20 (fixed, balloon or adjustable rate), an Adjustable Rate Rider 22 (if applicable), an Itemization of Amount Financed document 24, a Loan Document Worksheet 26, a Deed of Trust 28, an Escrow Waiver 30 (if applicable), and a 1003 (residential loan application) 21.

A predatory lending database 32 stores all of the federal, state, city and county predatory lending laws. The federal law is embodied in Section 32 of HOEPA. States that currently have predatory lending laws include Colorado, Connecticut, Florida, Illinois, Louisiana, North Carolina, Ohio, Pennsylvania, Virginia, Washington and West Virginia. The state, city and county laws differ in varying degrees from the federal law. The status of predatory lending legislation at all levels can be found on the Internet at http://www.mbaa.org/resources/predlend/.

A database 34 stores general information related to borrowers, lenders, properties and any other aspect of a loan. Borrower information may include without limitation personal information about the borrower such as his or her name, address, and Social Security number. Property information may include without limitation addresses and appraisal values. Lender information may include without limitation the lender's name, address and loan history. This general information can come internally from the operator of the system 10, and/or from one or more third party or external database sources. For example, property information could come from such third party sources as International Data Management Corporation (IDM), Data Quick and Management Risk Assessment Corporation (MRAC), and Accumail United States Postal Service National Database. Borrower and lender information could come from third party sources, such as Trans Union, Equifax, Lexis Nexis, Axiom, Info USA and Dunn and Bradstreet. One or more of the input devices may be connected to a printer 40 for printing reports 42 generated by the system 10 as further described herein.

The loan information, the predatory lending laws and the general information are stored in a database server 35 which includes communication software for communicating with third party or external databases not stored therein. It can be appreciated, however, that the loan information, the predatory lending laws and the general information could be each stored in a separate database server or stored in various combinations thereof as needed. In one embodiment, the server database 35 is a Dell Power-Edge 2400 running Sequel Server 2000 software in a Windows 2000 operating system environment. In a preferred embodiment, two database servers are provided for load balancing and redundancy.

Referring back to FIG. 1, the loan information may be input into system 10 for storage in loan database 12 via input devices 36. While input devices 36 as shown are personal computers, they can be any type of device that allows the input of data. Input devices 36 are shown as being located at the lender's establishment such that the loan information is input directly by the lender and then simply downloaded to database server 35 for storage in the loan database 12. The lender may in turn use a document preparation company to input and download the loan information directly for storage in loan database 12. Alternatively, the loan documents containing the loan information can be sent to the operator of the system 10 to be input via one or more input devices 37 connected either directly or remotely to an application server 39. Such input devices 37 may then also be used to input the predatory lending laws for storage in the predatory lending database 32.

Application server 39 is responsible for processing the necessary loan, predatory lending, and general information associated with a loan in order to detect whether predatory lending exists in connection with that loan. Application server 39 includes memory (not shown) for storing the programs necessary for determining whether predatory lending exists as will be further discussed herein. Application server 39 interfaces with the input devices 36 through server 38. The connection between input devices 36, 37 and server 38 can be via any communication network such as the telephone network, a satellite network, a cable network or any other communications network capable of transmitting information across it. Server 38 includes communication software to allow it to communicate with input devices 36. In one embodiment, servers 38 and 39 are Dell Power-Edge 1550 servers running Microsoft Internet Information Services (IIS) Server v5.0 software under a Windows 2000 advanced server operating system. In a preferred embodiment, server 38 is a web server that allows system 10 to be implemented through a website accessible via the Internet. However, it can be appreciated that any type of server having the necessary processing capabilities and storage capacity may be used. In a preferred embodiment, servers 38 and 39 are also each provided in duplicate for load balancing and redundancy.

Figure 2:
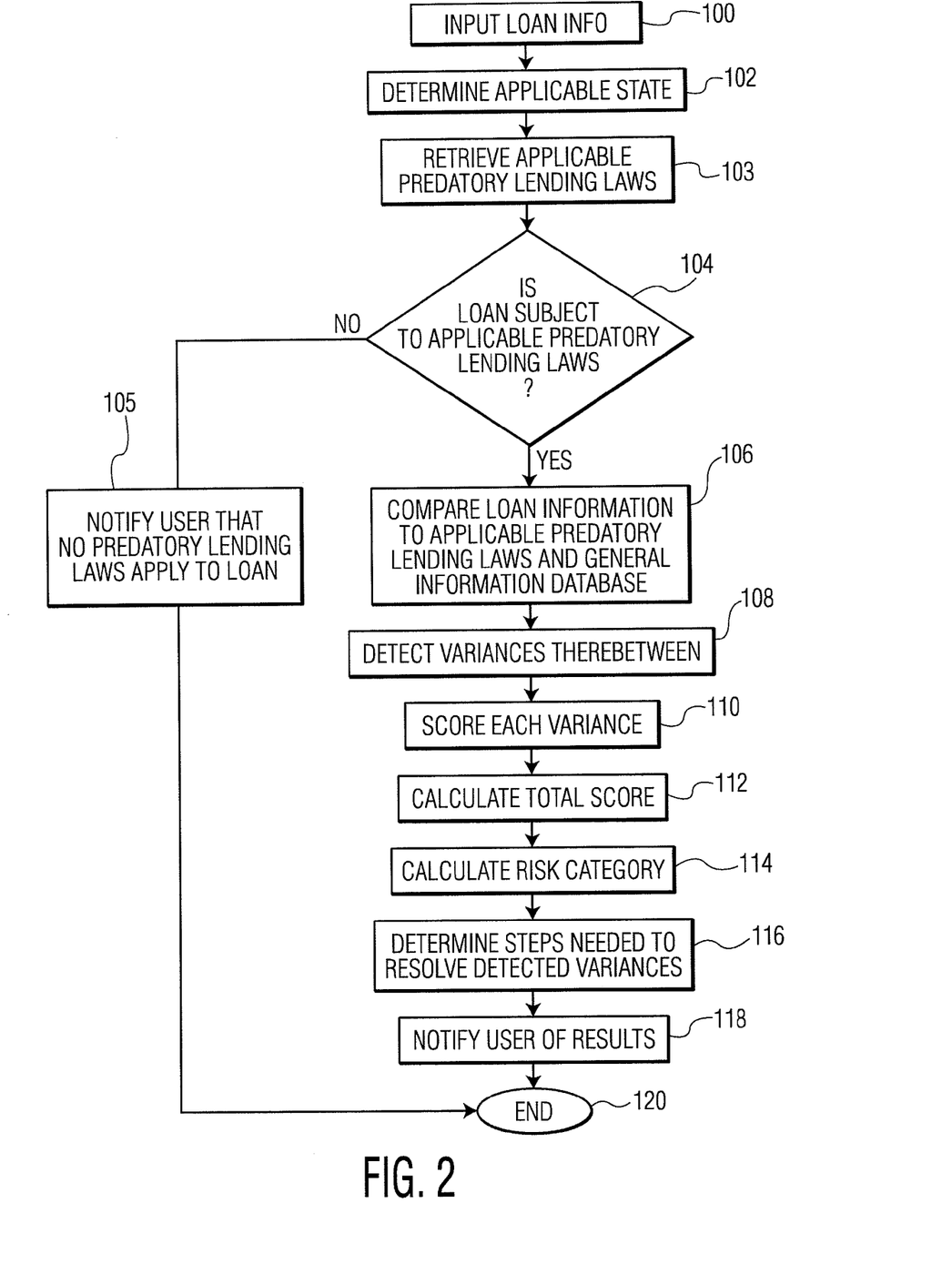
FIG. 2 is a flowchart illustrating one embodiment of the steps for detecting predatory lending in connection with the closing of a loan using the system of FIG. 1.
Figure 3:
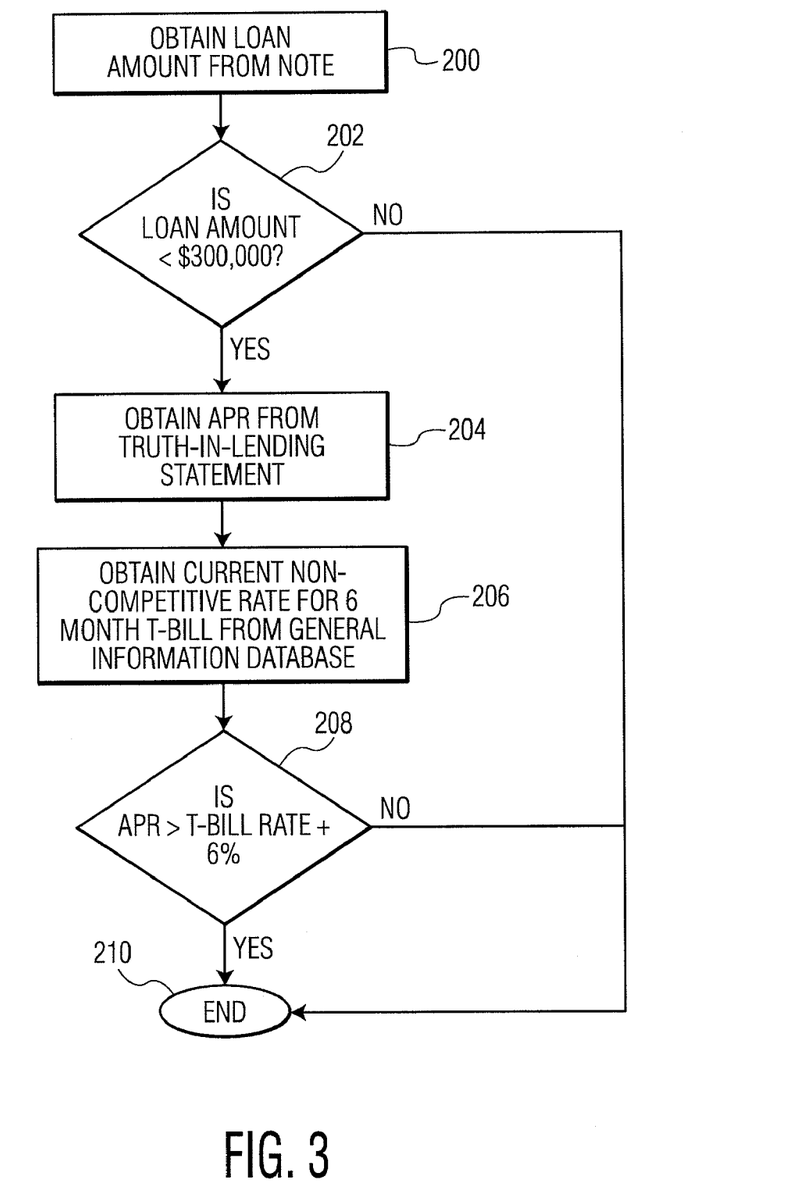
FIG. 3 shows a flowchart illustrating one embodiment of the step of determining whether the loan is subject to applicable predatory lending laws of FIG. 2 with respect to the predatory lending laws of the State of North Carolina.
Figure 9:
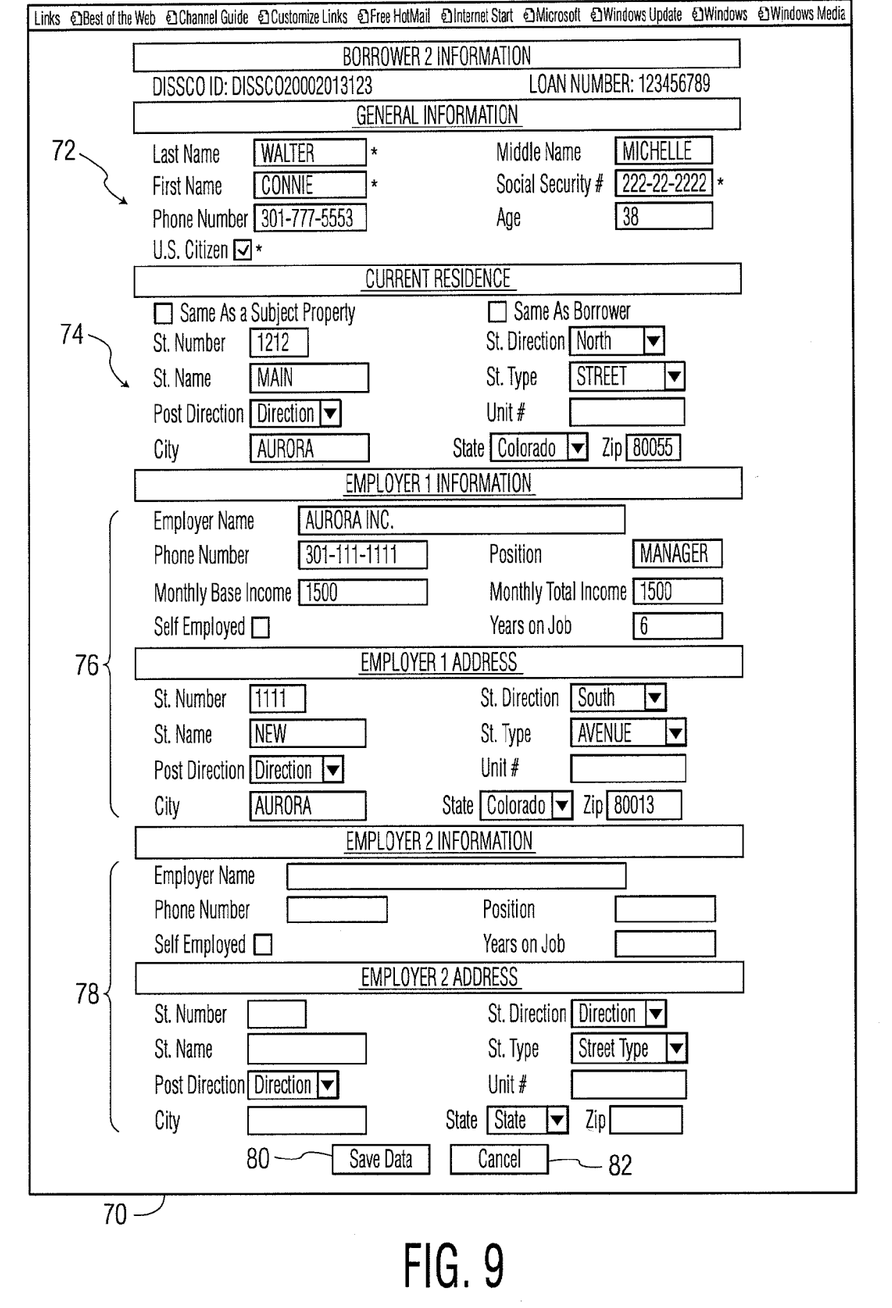
FIG. 9 shows one embodiment of an input screen display generated by the system of FIG. 1.

The process of detecting a loan in violation of any applicable predatory lending laws at the federal, state, city and county level will be described with reference to FIGS. 2, 3 and 9 and a web-based system 10 being accessed by a lender. It can be appreciated, however, that the system 10 need not be web-based to operate, and any user with access to the system 10 (i.e., not just a lender) may use the system 10. As shown in FIG. 2, at 100, loan information about a particular loan is input into system 10. Specifically, the lender logs on to system 10 through input device 36, whereupon several screens such as screen 70 shown in FIG. 9, are displayed, which include various fields in which loan information may be input. For example, screen 70 includes a General Information section 172 in which general information about the borrower can be input, such as last name, middle name, first name, Social Security number, phone number, age and citizenship. Current residence section 74 allows the lender to input information related to the borrower's current residence. Employer Information sections 76 and 78 allow the lender to input information related to the borrower's current and previous employers. Once the loan information has been input, the lender can save it by clicking on the Save Data button 80. If the lender does not wish to save the information, he or she can simply click the cancel button 82. Similar screens are displayed to the lender until all of the necessary loan information has been input. Once input, the information is downloaded to loan database 12.

Referring back to FIG. 2, at 102, application server 39 checks the loan information to determine the applicable state. Typically, the state information is taken from either the HUD statement, the Truth-in-Lending statement or the Note. Of course, it could be taken from any loan document having this information. At 103, the system 10 retrieves the predatory lending laws of that state from the predatory lending database 32. If the state or any city or county therein have no predatory lending laws, the federal HOEPA laws are applied. If the state to which the loan is subject also has an applicable city and/or county law, such law(s) are first applied to the extent they are not overridden by that state's predatory lending laws.

At 104, the system 10 determines whether the loan is subject to the applicable predatory lending laws. If no predatory lending laws apply, at 105 the lender is notified that no predatory lending laws apply to the loan. Such notification can be directly displayed on the screen of his or her input device 36. Alternatively, in the case where the loan is not being processed in real-time, notification can be sent to the lender via e-mail, facsimile or any other known notification method.

In making a determination whether the loan is subject to the applicable predatory lending laws, the system 10 examines certain loan information from various loan documents and compares that loan information to the applicable federal, state, city and/or county predatory lending laws. For the purposes of illustration only, step 104 will be explained with reference to North Carolina's predatory lending laws as set forth in FIG. 3.

Under North Carolina's predatory lending laws, all mortgage loans under $300,000 and having an annual percentage rate greater than the non-competitive rate for a six (6) month Treasury-bill (T-bill) by more than six percent (6%) are subject thereto. Accordingly, at 200, system 10 obtains the loan amount 50 from the Note 20 as shown in FIG. 7. If the loan amount is under $300,000, at 204, the system then obtains the annual percentage rate (APR) 52 indicated on the Truth-In-Lending statement 16 as shown in FIG. 6. Again, the loan amount and APR could equally be taken from any other loan documents having this information on them. At 206, the system 10 also obtains the current six (6) month T-bill rate stored in the general information database 34. At 208, the system 10 checks whether the APR exceeds the non-competitive rate for a six (6) month T-bill by more than six percent (6%). If the loan amount is under $300,000 and the APR exceeds such T-bill rate by more than six percent (6%), then the predatory lending laws of North Carolina apply to the loan. If either one of these conditions is not met, North Carolina's predatory lending law does not apply to the loan. At 210, the process ends. While the process shown in FIG. 3 has the loan amount determination done prior to the APR determination, it can be appreciated that the order of those determinations could be reversed.

Figure 4:
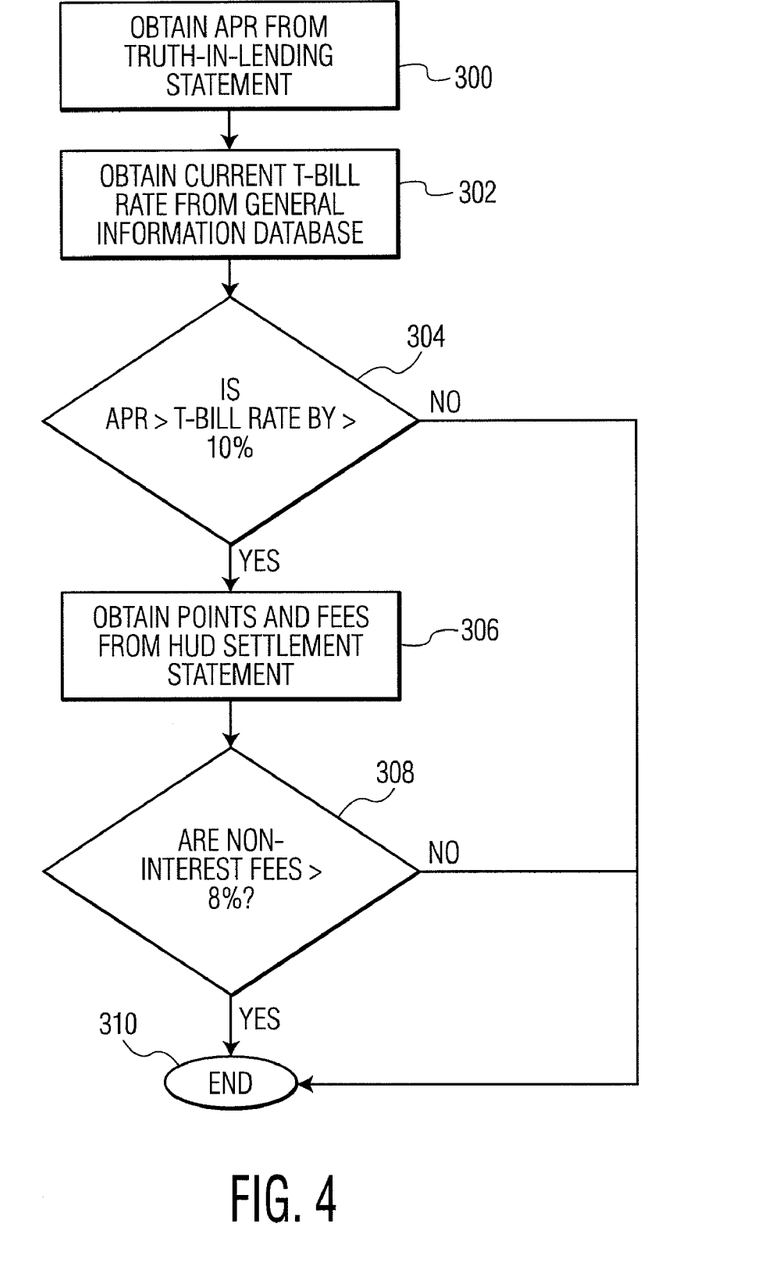
FIG. 4 shows a flowchart illustrating one embodiment of the step of determining whether the loan is subject to applicable predatory lending laws of FIG. 2 with respect to HOEPA.

In the event that a state does not have any predatory lending laws, the federal law, HOEPA, will be applied to the loan. HOEPA lays out a two-part test for determining whether loans are subject thereto. As shown in FIG. 4, at 300, the system 10 obtains the APR 52 from the Truth-In-Lending statement 16 as shown in FIG. 6. At 302, the system also obtains the current T-bill rate on a bond of comparable maturity from the general information database 34. At 204, the system 10 determines whether the APR exceeds such T-bill rate by more than ten (10%) percent. If so, at 306, the system obtains the points and fees from the HUD Settlement statement as shown in FIG. 5. Typically, the points and fees are found in the "Total Sales Broker's Commission" section 54, the "Items Payable in Connection With The Loan" section 56, and the "Additional Settlement Charges" section 58. Of course, they may be found in other sections of the HUD settlement statement. Again, the APR and points and fees could equally be taken from any other loan documents having this information on them. At 308, the system 10 determines if the non-interest fees exceed ten percent (10%) of the loan amount. If one of these two conditions is not satisfied, the loan is not subject to HOEPA. It can be appreciated of course that the order of steps 302 and 304 and steps 306 and 308 can be reversed. This process ends at 310.

Referring back to FIG. 2, if the loan is subject to a predatory lending law, at 106 the system 10 compares certain loan information to the applicable predatory lending laws(s) and the information in the general information database 34, and at 103 detects each variance or difference therebetween. The variance may represent the difference between the actual loan information and that allowed under the applicable predatory lending law(s). For example, with respect to HOEPA, if the APR of a loan is 18% and the current T-bill rate for a bond of comparable maturity is 5%, the detected variance will be 3% (i.e., the APR is 3% greater than the T-bill rate plus 10%). The variance may also represent the difference between the loan information stored in the loan database 12 and that stored in the general information database 34. For example, the system 10 checks the Social Security number provided by the borrower in the loan documents against a database containing all Social Security numbers used in death claims. If the borrower's Social Security number is identified in their database, a variance will be detected. By detecting such variances, the system 10 can detect actual violations of the applicable predatory lending law(s), as well as potential violations and fraud.

At 110, the system 10 scores each variance based on the degree thereof. In one embodiment, the higher the degree of variance, the lower the score. It can be appreciated, however, that a reverse scoring system could be used whereby a higher a degree of variance results in a higher score. For example, if the applicable predatory lending law prohibits APR's greater than ten percent (10%), a loan having an APR of 11% will be scored lower than a loan having an APR of 15%. Nevertheless, both would be scored to reflect a violation of the predatory lending law. At 112, the system 10 totals the score of each variance and at 114, assigns the total score a risk category. In one embodiment, a total score ranging between 600 and 1000 results in a Pass status, a total score ranging between 401 and 599 results in an "High" status, and a total score ranging between 0 and 400 results in an Investigate status. A Pass status means that there were no or minimal variances (i.e., no actual predatory lending violations) detected in connection with the loan. A High status means that while there were no actual predatory lending violations, the variances are "borderline" (i.e., reflect a potential predatory lending violation). An Investigate status means that there is some aspect of the loan that violates the applicable predatory lending law(s). So, in the example where the APR violates the applicable predatory lending law, the score would be at least less than or equal to 400. It can be appreciated, however, that any type of scoring system, including a non-numeric one, could be used.

At 116, the system 10 determines what step or steps are needed to resolve any detected variances. For example, if the APR was two percent (2%) too high, the system would determine that the APR needed to be lowered and by what amount. At 118, the system 10 notifies the user of the results and at 120 the process ends.

Figure 8:
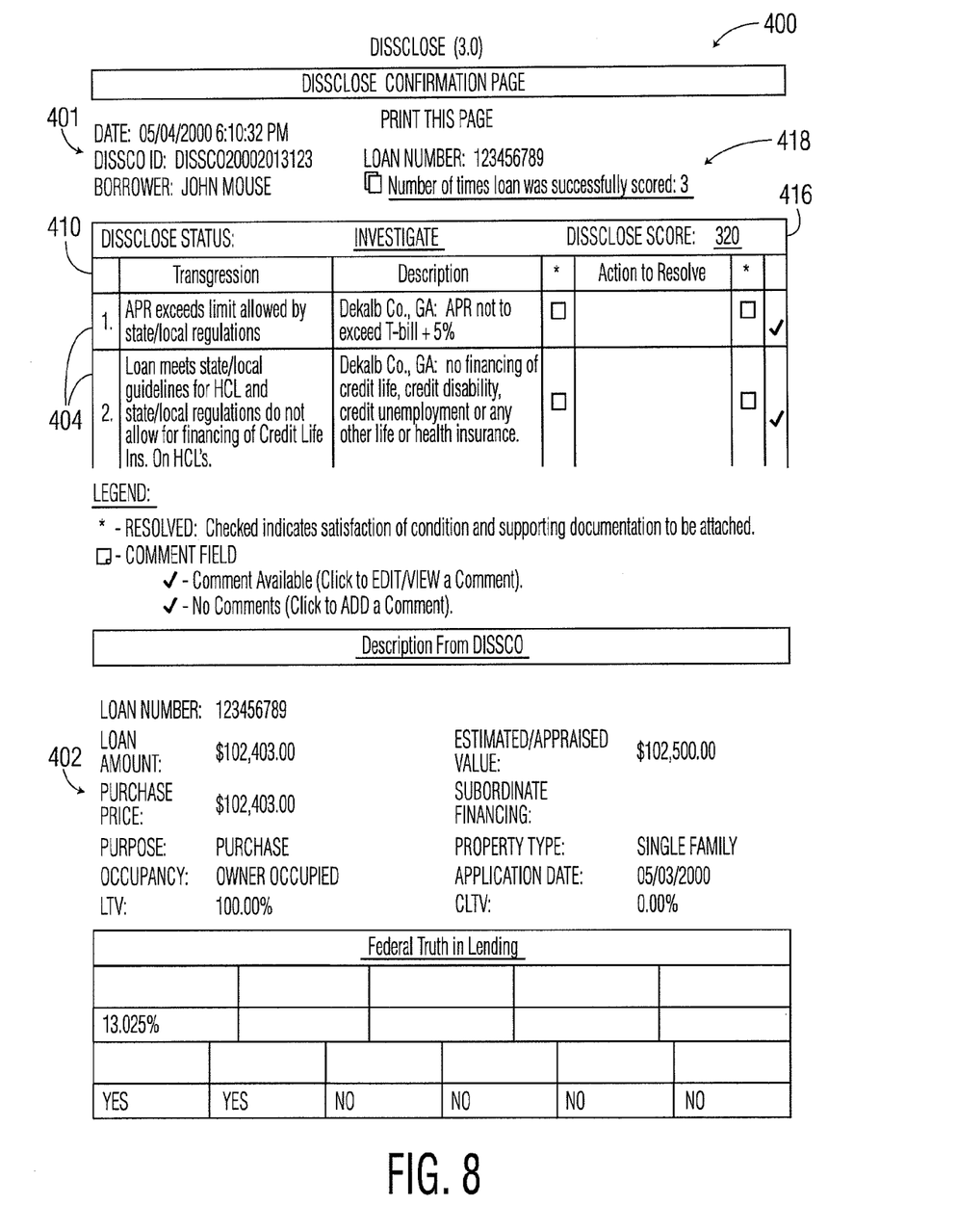
FIG. 8 shows one embodiment of a report generated by the system and method of the present invention.

FIG. 8 shows one embodiment of how system 10 may notify a user of its results. Specifically, a screen 400 is displayed to the user on his or her input device. In section 401, identifying information about the loan is displayed, such as the borrower and loan number. In section 402, more detailed loan information is provided, such as for example the loan amount, purchase price, estimated/appraised value of the property, property type and the loan application date. Section 404 provides a summary of the results of the loan as processed by system 10. At 406, the total score is displayed, and at 408, the risk category is identified.

In the case of an Investigate status, section 410 identifies the variance or transgression and at 412, provides a description of the applicable predatory lending law provision that is being transgressed. In the example shown, the first transgression is that the loan has an APR which exceeds the limit allowed under the applicable law which, in the example shown, is that of DeKalb County, Ga. This predatory lending law prohibits the APR from exceeding the T-bill rate by more than five percent (5%). The second transgression indicates that state/local regulations do not allow for financing of credit life insurance on high-cost loans. The particular regulation is again that of DeKalb County, Ga. which prohibits the finance of credit life, credit disability, credit unemployment or any other life or health insurance in connection with a high-cost loan. At 414, the system 10 identifies any action that can be taken to resolve the transgression. A section 416 is also preferably provided which allows any additional comments regarding the transgression, as well as a section 418 which allows the user to track the status of a transgression and if and when it has been resolved.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

We claim:

1. A computer-implemented method of detecting predatory lending in connection with one or more loans, comprising:
   receiving information pertaining to the one or more loans using a computer system;
   storing general loan information at the computer system;
   comparing using the computer system the information for each loan to at least one predatory lending rule and to the general loan information to detect one or more variances therebetween, each variance having a certain degree;
   scoring each variance based upon the degree thereof using the computer system, whereby knowledge of the at least one predatory lending rule on behalf of a user of the system is not required;
   calculating a total numeric risk score for each loan based on scored variances using the computer system;
   assigning using the computer system a risk category to the loan based on the total numeric risk score; and
   displaying a computer screen including the total numeric risk score and the risk category for each loan to a user of the system.

2. The method of claim 1, wherein the step of assigning the risk category further comprises determining the risk category for each loan based on a sum of scores for each detected variance associated therewith.

3. The method of claim 1, further comprising notifying a user of the system when one or more variances are detected.

4. The method of claim 3, further comprising determining one or more steps needed to resolve each detected variance, and notifying the user of each detected variance and the one or more steps necessary to resolve it.

5. The method of claim 1, further comprising tracking the status of each detected variance associated with each loan.

6. The method of claim 1, wherein the at least one predatory lending rule includes at least one of a city, county and state rule, the loan information includes the city, county and state in which the loan is to be closed, and further comprising the steps of: identifying the city, county and state rules associated with each loan; and applying the predatory lending rules of the identified city, county and state to the loan information for each loan.

7. The method of claim 1, further comprising detecting fraud in connection with the loan based on the one or more detected variances.

8. The method of claim 1, wherein the method is implemented in a web-based environment.

9. The method of claim 2, wherein the step of displaying the total numeric risk score and the risk category for each loan comprises displaying a pass status indicator to a user if the sum of the scores falls within a first score range.

10. The method of claim 2, wherein the step of displaying the total numeric risk score and the risk category for each loan comprises displaying a high risk status indicator to a user if the sum of the scores falls within a second score range.

11. The method of claim 2, wherein the step of displaying the total numeric risk score and the risk category for each loan comprises displaying an investigate status indicator to a user if the sum of the scores falls within a third score range.

* * * * *

UNITED STATES PATENT AND TRADEMARK OFFICE
CERTIFICATE OF CORRECTION

PATENT NO. : 7,689,503 B2  Page 1 of 1
APPLICATION NO. : 09/993072
DATED : March 30, 2010
INVENTOR(S) : Steven C. Halper and Constance A. Wilson It is certified that error appears in the above-identified patent and that said Letters Patent is hereby corrected as shown below:

In the References Cited item (56), on Page 1 of the patent, in the second column under OTHER PUBLICATIONS, the second reference listed, the word "Corporatin" should be deleted and replaced with the word "Corporation.".

In the References Cited item (56), on Page 2 of the patent, in the second column, line 23 under OTHER PUBLICATIONS, the website citation should include a "." after "hsh" instead of a ",".

In the References Cited item (56), on Page 2 of the patent, in the second column, line 39 under OTHER PUBLICATIONS, the second instance of the word "Case" should be deleted and replaced with the word "CASA.".

Signed and Sealed this

Seventh Day of September, 2010

David J. Kappos
*Director of the United States Patent and Trademark Office*